(12) United States Patent
Naito et al.

(10) Patent No.: US 9,625,710 B2
(45) Date of Patent: Apr. 18, 2017

(54) OPTICAL ELEMENT, AN OPTICAL SCANNING DEVICE, A MANUFACTURING METHOD OF THE OPTICAL ELEMENT, AND A MOLDING DIE

(71) Applicant: KONICA MINOLTA, INC., Tokyo (JP)

(72) Inventors: Atsushi Naito, Aichi-ken (JP); Hiroshi Takagi, Tokyo (JP); Shinichiro Hara, Tokyo (JP); Toshiyuki Majima, Aichi-ken (JP); Naoki Kaneko, Tokyo (JP); Takao Arakawa, Aichi-ken (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/377,628

(22) PCT Filed: Jan. 23, 2013

(86) PCT No.: PCT/JP2013/051352
§ 371 (c)(1),
(2) Date: Aug. 8, 2014

(87) PCT Pub. No.: WO2013/118580
PCT Pub. Date: Aug. 15, 2013

(65) Prior Publication Data
US 2016/0025969 A1    Jan. 28, 2016

(30) Foreign Application Priority Data

Feb. 9, 2012    (JP) .................................. 2012-025661

(51) Int. Cl.
*G02B 26/12*    (2006.01)
*G02B 3/06*    (2006.01)
(Continued)

(52) U.S. Cl.
CPC ........ *G02B 26/125* (2013.01); *B29C 45/0025* (2013.01); *B29C 45/2708* (2013.01);
(Continued)

(58) Field of Classification Search
CPC .... G02B 26/10; G02B 26/124; G02B 26/125; G02B 1/04; G02B 1/041; G02B 3/06
(Continued)

(56) References Cited

U.S. PATENT DOCUMENTS 6,144,505 A        11/2000  Nakanishi et al.
2006/0017998 A1*    1/2006  Fujino ................ G02B 27/0031
                                                    359/204.1
(Continued)

FOREIGN PATENT DOCUMENTS

JP    2003-215444 A    7/2003
JP    2006-276720 A    10/2006
(Continued)

OTHER PUBLICATIONS

International Search Report for International Applicaiton No. PCT/JP2013/051352; date of mailing Apr. 23, 2013, with English Translation.
(Continued)

*Primary Examiner* — Thomas K Pham
*Assistant Examiner* — Marin Pichler
(74) *Attorney, Agent, or Firm* — Cantor Colburn LLP

(57) ABSTRACT

The optical element is a long optical element obtained by detaching a long main body part connected to a runner part via a gate part including an optical part from the gate part and chipping the detached main body, the optical part including at least a first optical surface to allow light to pass there through or to reflect light. The first optical surface has a curved surface that is curved on the short direction at least at the longitudinal end, while the first edge of the first optical (Continued)

surface side on the end surface of gate part side in the main body part is curved according to the curved surface example of the first optical surface. The boundary surface between the main body part and the gate part is formed so as to be narrower than the end surface of the gate part side of the main body part. At least the distance between the site corresponding to the effective region on the first optical surface at the first edge and the site corresponding to the effective region on the first optical surface at the second edge of the first optical surface side on the boundary surface is uniformly formed.

6 Claims, 15 Drawing Sheets

(51) Int. Cl.
| | | |
|---|---|---|
| *B29C 45/72* | (2006.01) | |
| *G02B 1/04* | (2006.01) | |
| *B29C 45/27* | (2006.01) | |
| *B29C 45/00* | (2006.01) | |
| *B29D 11/00* | (2006.01) | |
| *B29L 31/00* | (2006.01) | |
| *B29L 11/00* | (2006.01) | |

(52) U.S. Cl.
CPC .... *B29C 45/7207* (2013.01); *B29D 11/00432* (2013.01); *G02B 1/041* (2013.01); *G02B 3/06* (2013.01); *G02B 26/123* (2013.01); *B29K 2995/0029* (2013.01); *B29L 2011/0016* (2013.01); *B29L 2031/764* (2013.01)

(58) Field of Classification Search
CPC .............. G02B 26/123; B29C 45/7207; B29C 45/0025; B29C 45/2708; B29L 2011/0016–2011/0033; B29L 2011/0058; B29L 2031/764; B29D 11/00432; B29K 2995/0029
USPC ............. 359/708–711; 264/1.1, 2.5; 425/808
See application file for complete search history.

(56) References Cited

U.S. PATENT DOCUMENTS

| | | |
|---|---|---|
| 2010/0054809 A1 | 3/2010 | Takahashi et al. |
| 2011/0299377 A1* | 12/2011 | Hanashiro ................ G11B 7/22 369/112.23 |
| 2012/0008183 A1 | 1/2012 | Hara et al. |
| 2012/0008184 A1 | 1/2012 | Hara et al. |

FOREIGN PATENT DOCUMENTS

| | | |
|---|---|---|
| JP | 2009-184241 A | 8/2009 |
| WO | 2010109965 A1 | 9/2010 |
| WO | 2012008183 A1 | 1/2012 |

OTHER PUBLICATIONS

Edited by Jay Shoemaker: "Moldflow Design Guide A Resource for Plastics Engineers First Edition", Moldflow Corporation, Dec. 31, 2006 pp. 1-171.

Extended European Search Report corresponding to Application No. 13746350.1-1706/2813341 PCTIJP2013/051352; Date of Mailing: Sep. 24, 2015.

Japanese Notification of Reasons for Refusal corresponding to Application No. 2013-557461; Mailing Date: Sep. 27, 2016, with English translation.

Japanese Notification of Reasons for Refusal corresponding to Patent Application No. 2013-557461; Mailing Date: May 31, 2016, with English translation.

\* cited by examiner

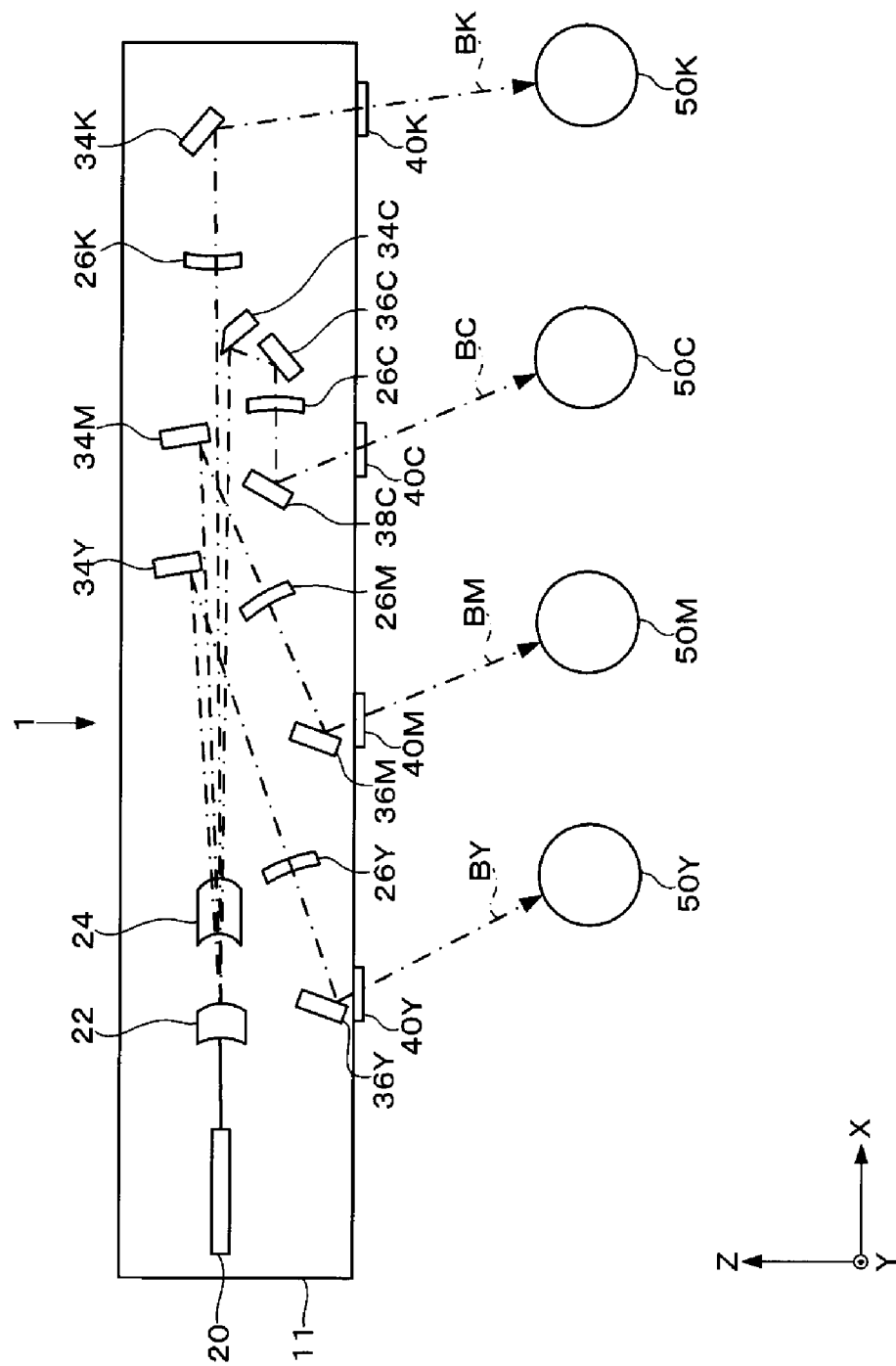

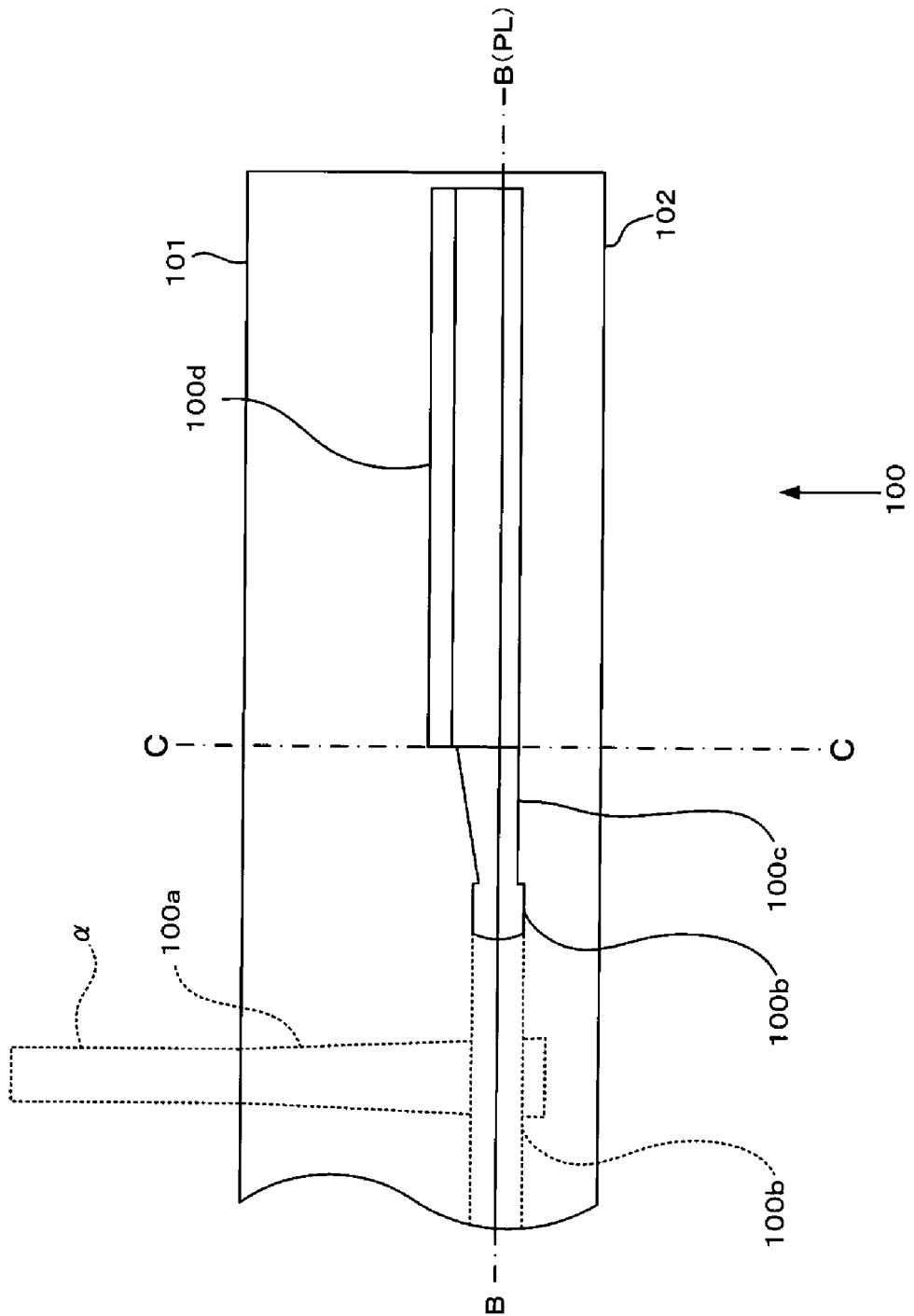

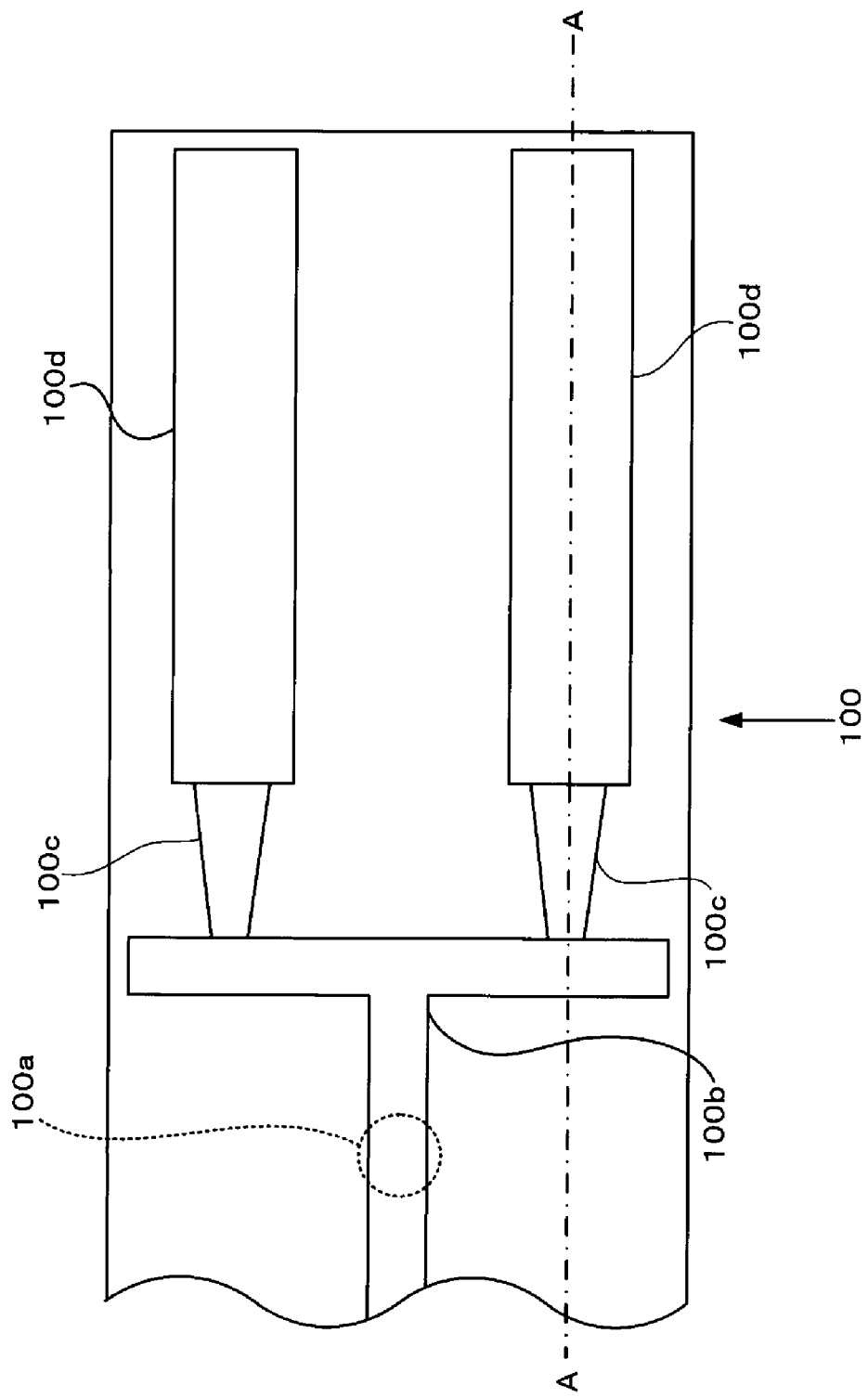

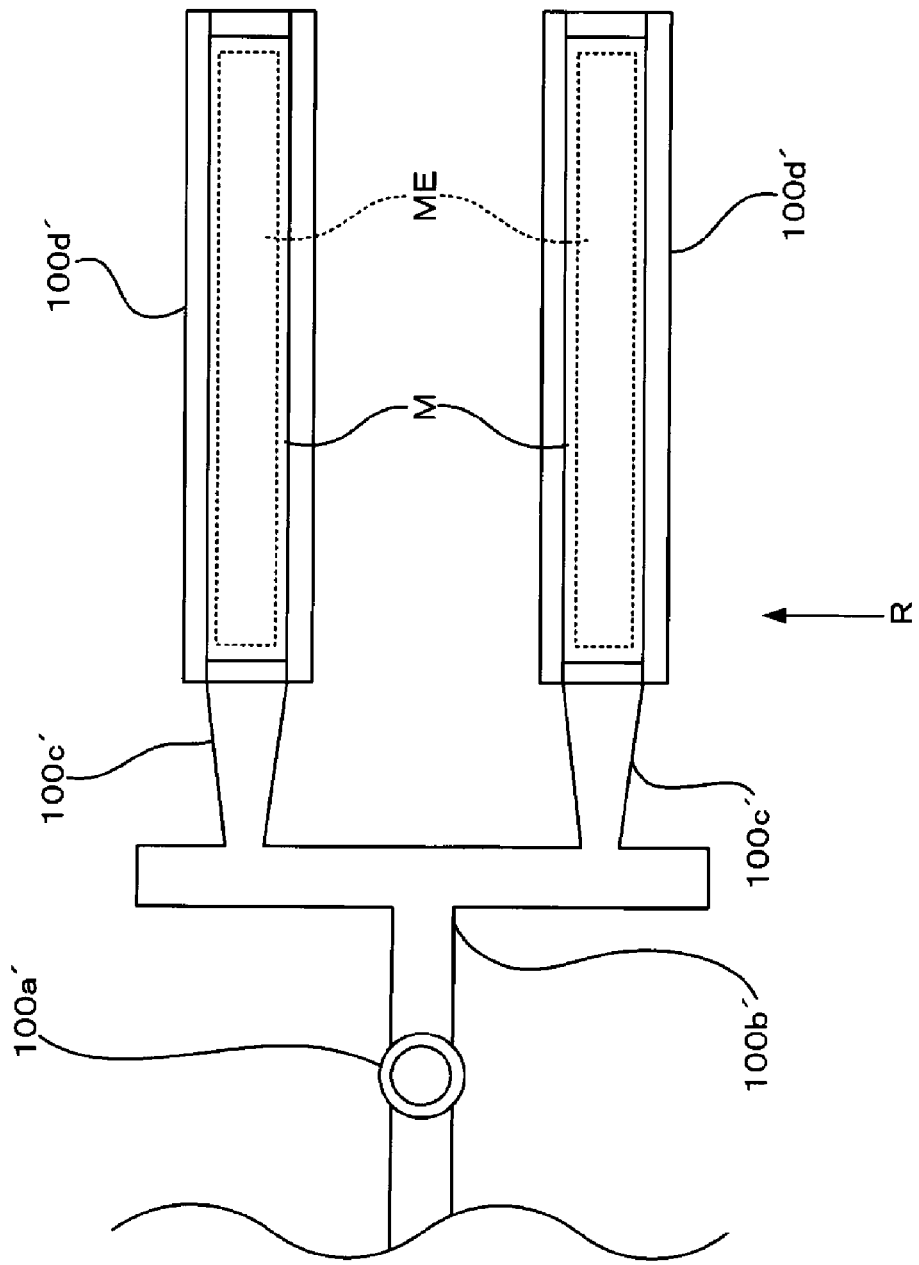

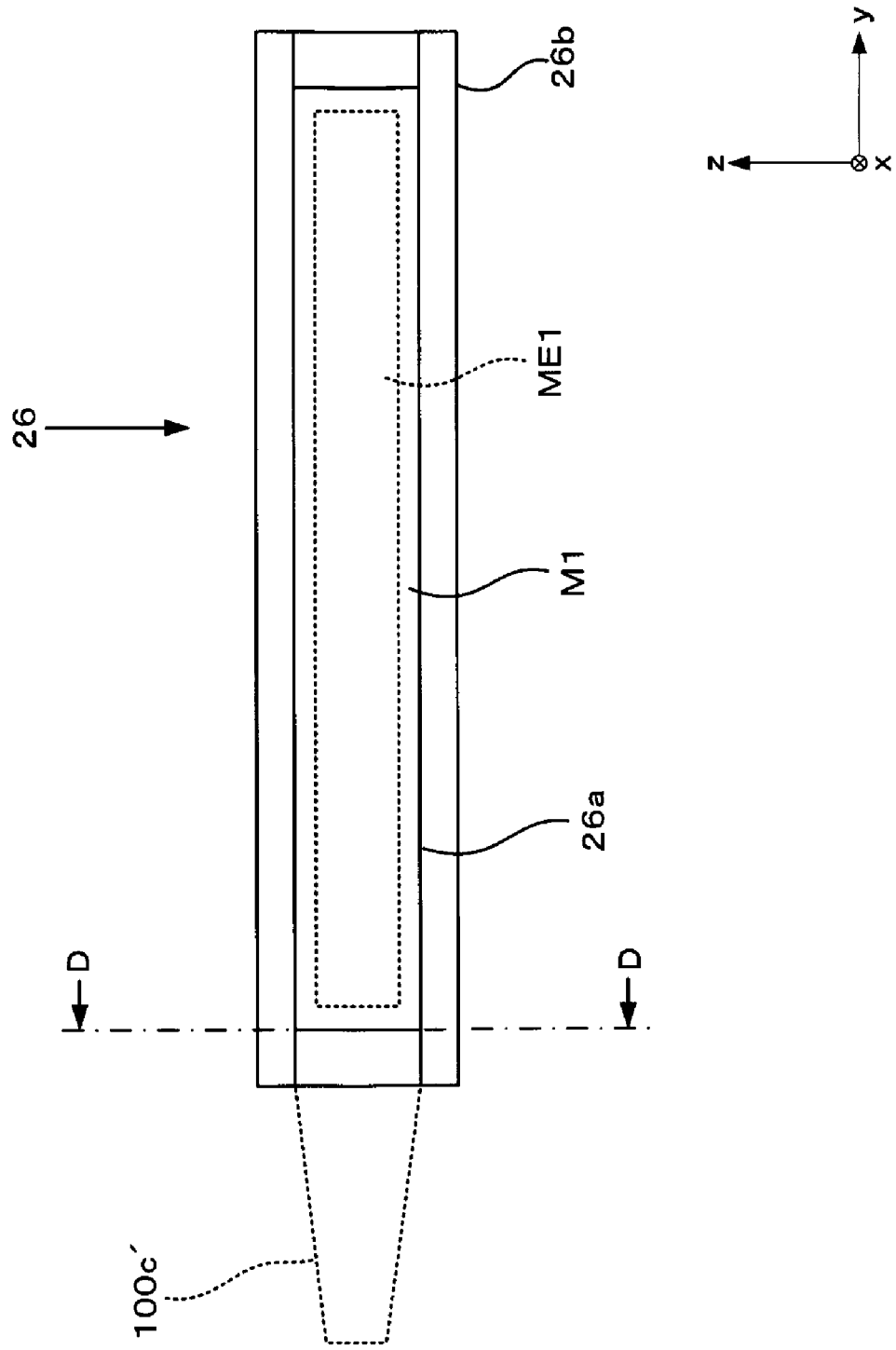

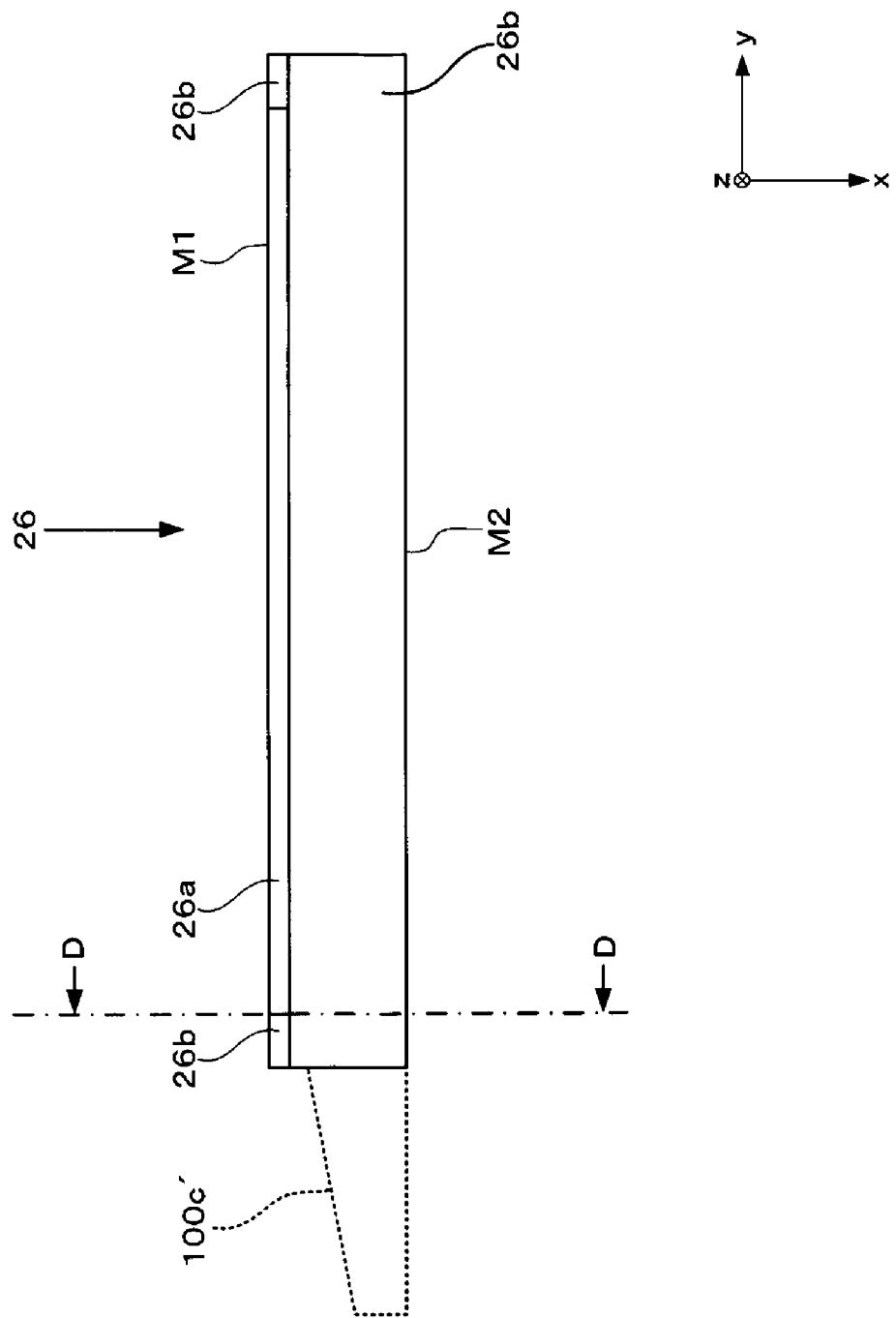

FIG. 6C
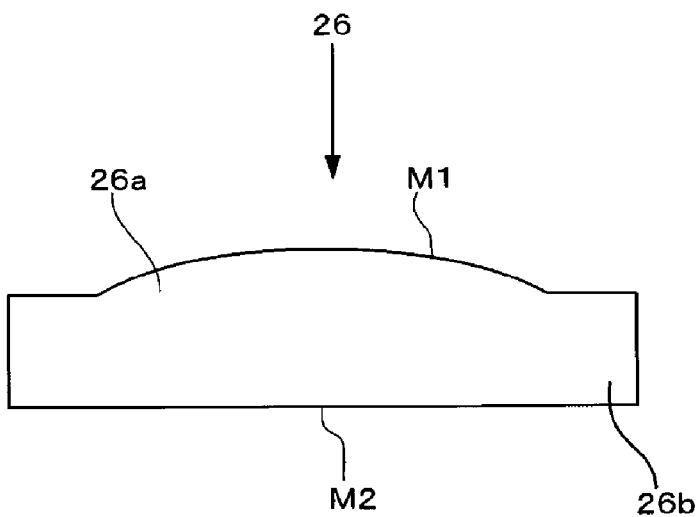
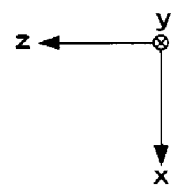
FIG. 6D
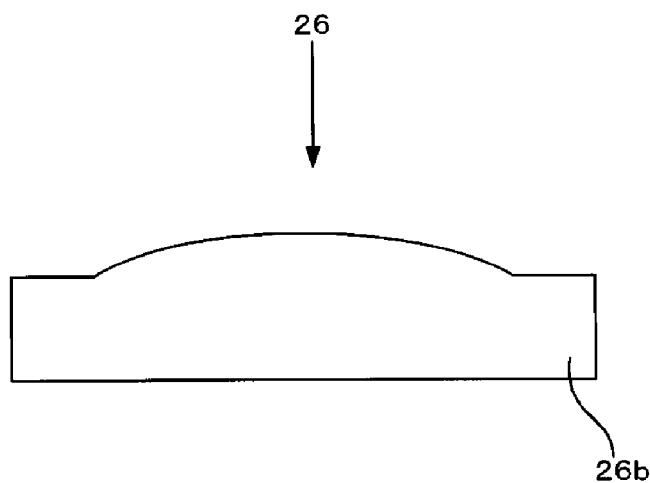
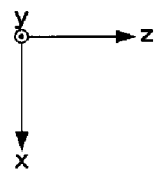

FIG. 7
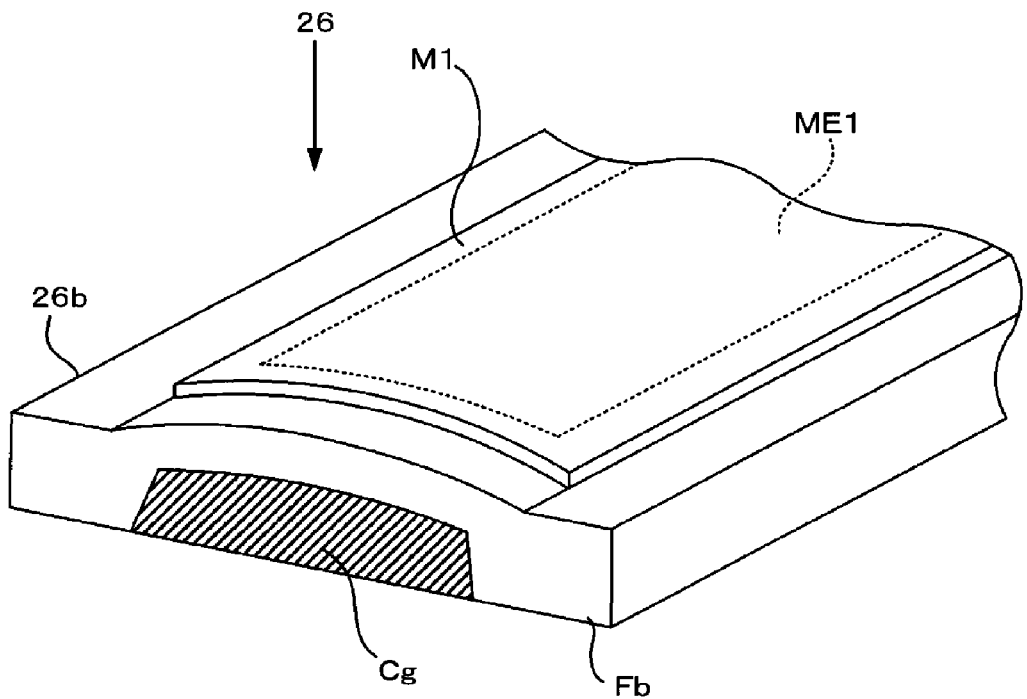
FIG. 8
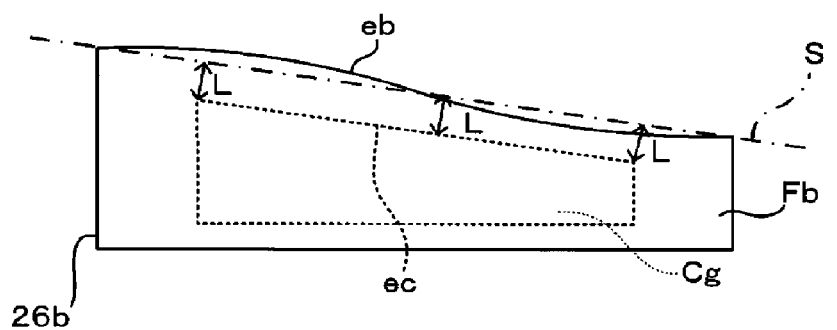
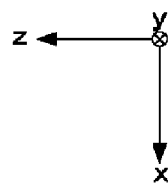

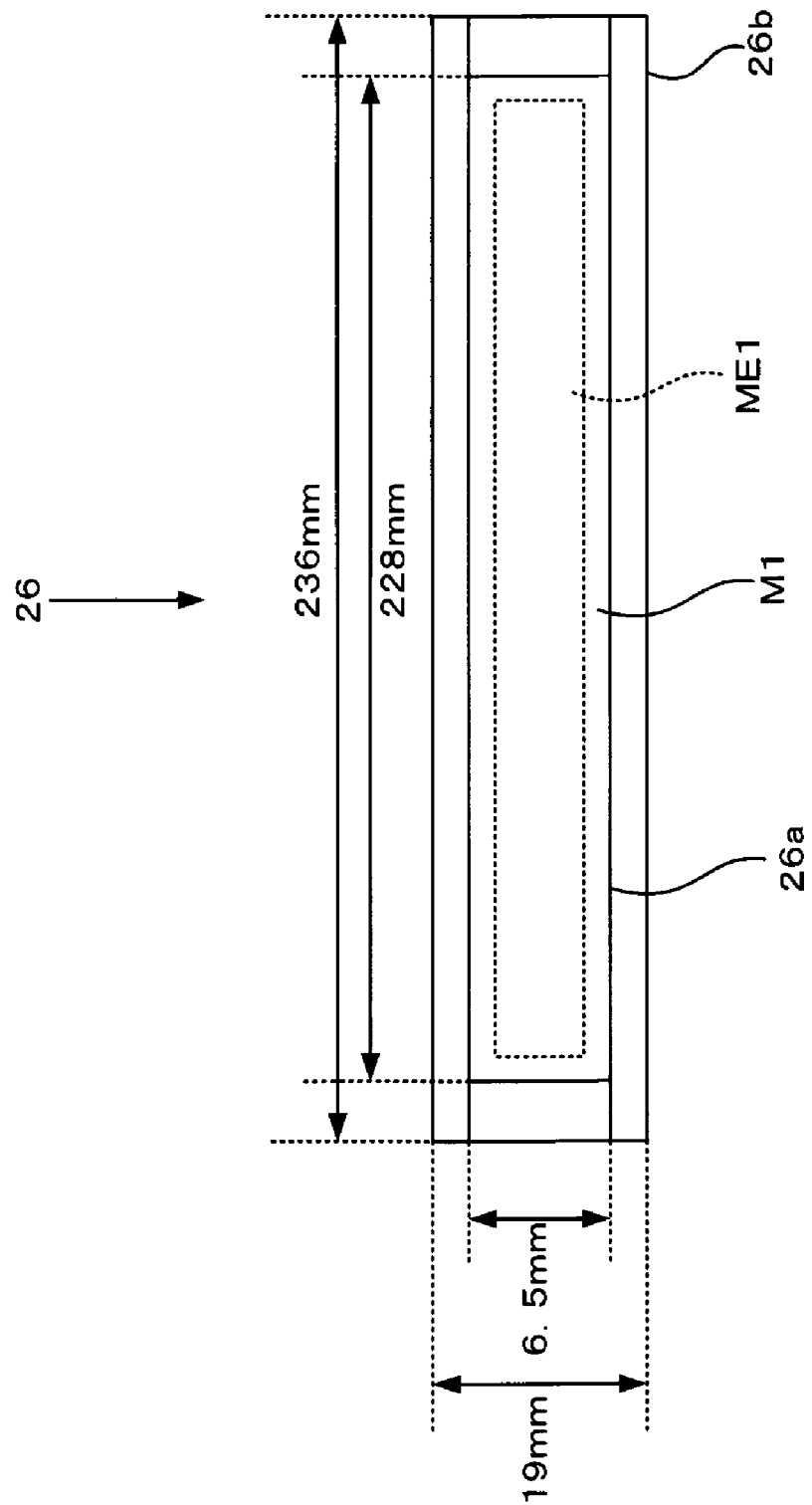

OPTICAL ELEMENT, AN OPTICAL SCANNING DEVICE, A MANUFACTURING METHOD OF THE OPTICAL ELEMENT, AND A MOLDING DIE

CROSS REFERENCE TO RELATED APPLICATIONS

This is the U.S. national stage of application No. PCT/JP2013/051352, filed on 23 Jan. 2013. Priority under 35 U.S.C. §119(a) and 35 U.S.C. §365(b) is claimed from Japanese Application No. 2012-025661, filed 9 Feb. 2012, the disclosure of which is also incorporated herein by reference.

FIELD OF THE INVENTION

The present invention relates to an optical element, an optical scanning device, a manufacturing method of the optical element, and a molding die.

BACKGROUND OF THE INVENTION

Recently, regarding optical scanning devices used for image formation apparatuses in electrophotographic systems, etc., resin optical elements such as long lenses and mirrors exemplified by a scanning lens and scanning mirror have been used. Using resin is advantageous in that light and inexpensive elements having a complex shape suitable for the optical scanning device side with respect to such aspects as size and layout can be relatively easily obtained.

On the other hand, a method of obtaining optical elements using molding technology referred to as injection molding is known as one resin manufacturing method of optical elements. For example, injection molding is carried out as follows. First, melted liquid resin is injected into a die via the nozzle of an injection molding machine. Resin is filled into a cavity via a gate while passing through a sprue and runner provided in the die. The resin molded material is removed from the die once the resin filled into the cavity has solidified. Consequently, a molding article (here, an optical element) corresponding to the cavity shape can be obtained by detaching the resin portion filled into the cavity from the resin portion filled into the gate.

FIGS. 5 to 7, etc. in Patent Document 1 illustrate a technology for performing injection molding such that optical axial thicknesses equal at respective borders of the gate part and the flange part prior to the gate being detached as a technology for injection-molding the abovementioned optical element (for example, a long lens). According to Patent Document 1, it is possible to prevent from generating weld lines caused by air involution at the molded site of the flange part in the vicinity of the gate by uniformly forming the connecting piece between gate [6b] and cavity [6a].

PRIOR ART DOCUMENTS

Patent Documents

[Patent Document 1] Japanese Unexamined Patent Application Publication No. 2009-184241

SUMMARY OF THE INVENTION

Problem to be Solved by the Invention

However, this is disadvantageous in that it is difficult to assess the detachment position when lens part [2] (flange part [3]) is detached from gate part [4] as the connecting piece between gate part [4] and lens part [2] (flange part [3]) is uniformly formed in plastic lens optical element [1] of Patent Document 1. Accordingly, the optical performance is adversely affected by mistakenly cutting the flange part; moreover, the residual amount of the gate part from cutting increases as a result of preventing the flange part from being cut, making it disadvantageous in that post processing of the element is required in addition to the size of the optical scanning device having to be increased in order to accommodate space in which elements are incorporated. Moreover, the resin filled into cavity [6a] easily flows back to gate [6b] as the cross-section of cavity [6a] is identical to the cross-section of gate [6b], potentially affecting the optical performance of the optical element.

On the other hand, the abovementioned problems in cutting and problems with flowback can be avoided by configuring the gate cross-section of the die to be smaller than the cavity cross-section of the die; however, this results in problems due to imperfect molding. According to the research of the present inventors, when an optical surface is formed of a curved surface in order to achieve high optical performance, the generation of imperfect molding is known to be particularly prominent, along with the easy generation of a wavy stripe pattern (hereinafter, referred to as flow marks) on the surface of the molding article. Moreover, when manufacturing a long optical element is manufactured by injection molding, it is recommended that injection be carried out in the shortest possible time in order to prevent variability of the optical performance in the longitudinal direction of the optical element, in addition to shortening the manufacturing time. If the injection speed is increased according to such a recommendation, the abovementioned flow marks are known to be easily generated.

The present invention was created in order to solve the abovementioned problems, with the object of providing an optical element having good optical performance with reduced molding imperfections while enabling ease of manufacturing. Moreover, another object of the present invention is to provide a manufacturing method that enables the simplified manufacture of an optical element in addition to reducing molding imperfections and having good optical performance, along with a die used for the manufacturing method. Further, still another object of the present invention is to provide a novel and useful optical scanning device with good optical performance without increasing the size of the optical scanning device.

Means of Solving the Problem

The abovementioned problems in cutting and problems with flowback can be avoided by configuring the gate cross-section of the die to be smaller than the cavity cross-section of the die; however, when an optical surface is formed of a curved surface, the potential of variability of flow-condition and flow mark increase in ingression of resin from gate to cavity.

Effects of the Invention

According to the optical element of the present invention, the first optical surface has a curved surface that is curved on the short direction at least at the longitudinal end; moreover, the first edge on the first optical surface side of the end surface of the gate side in the main body part is curved according to the example of the first optical surface. Moreover, the boundary surface between the main body part and the gate part is formed so as to be narrower than the end surface of the gate side of the main body part. Moreover, at least the distance between the site corresponding to the effective region on the first optical surface at the first edge and the site corresponding to the effective region on the first optical surface at the second edge of the first optical surface side on the boundary surface is uniformly formed. Accordingly, the optical element is easily manufactured, molding imperfections such as flow marks are reduced, and good optical performance is achieved.

Moreover, according to the manufacturing method of the optical element of the present invention, a molding die is used, wherein the end surface of the gate side is formed so as to be narrower than the end surface of the cavity side at the connecting piece between the gate and the cavity; moreover, the distance between the first edge within a predetermined range on end surface of the cavity side and the corresponding second edge on end surface of the gate side is substantially uniformly formed. Accordingly, it becomes possible to manufacture an optical element without imperfections in appearance such as flow marks. As a result, defective products are reduced, enabling improvement in the yield ratio. Moreover, the section corresponding to the gate and the section corresponding to the cavity can be easily detached, enabling optical elements to be easily manufactured.

Further, the optical scanning device according to the present invention has good optical performance without increasing the size of the optical scanning device.

Moreover, according to the molding die of the present invention, the first edge within a predetermined range on end surface of the cavity side is curved at the connecting piece between the gate and the cavity, the corresponding second edge on end surface of the gate side is curved according to the example of the first edge, and the end surface of the gate side is formed so as to be narrower than the end surface of the cavity side; further, the distance between the first edge within a predetermined range and the corresponding second edge of the end surface of the gate side is uniformly formed. Accordingly, it is possible to reduce appearance imperfections such as flow marks generated in the molding article. As a result, defective products are reduced, enabling improvement in the yield ratio.

BRIEF DESCRIPTION OF THE DRAWINGS

FIG. 2 illustrates the structure of the optical scanning device according to the embodiment.

FIG. 3A illustrates the structure of the molding die according to the embodiment.

FIG. 3B illustrates the structure of the molding die according to the embodiment.

FIG. 5 illustrates the resin molded material according to the embodiment.

FIG. 6A illustrates the optical element according to the embodiment.

FIG. 6B illustrates the optical element according to the embodiment.

FIG. 6C illustrates the optical element according to the embodiment.

FIG. 6D illustrates the optical element according to the embodiment.

FIG. 7 illustrates the optical element according to Comparative Example 1.

FIG. 8 illustrates the optical element according to Comparative Example 2.

FIG. 10A illustrates the optical element according to the embodiment.

MODE FOR CARRYING OUT THE INVENTION

<Embodiment>
[Optical Scanning Device]

Figure 1:
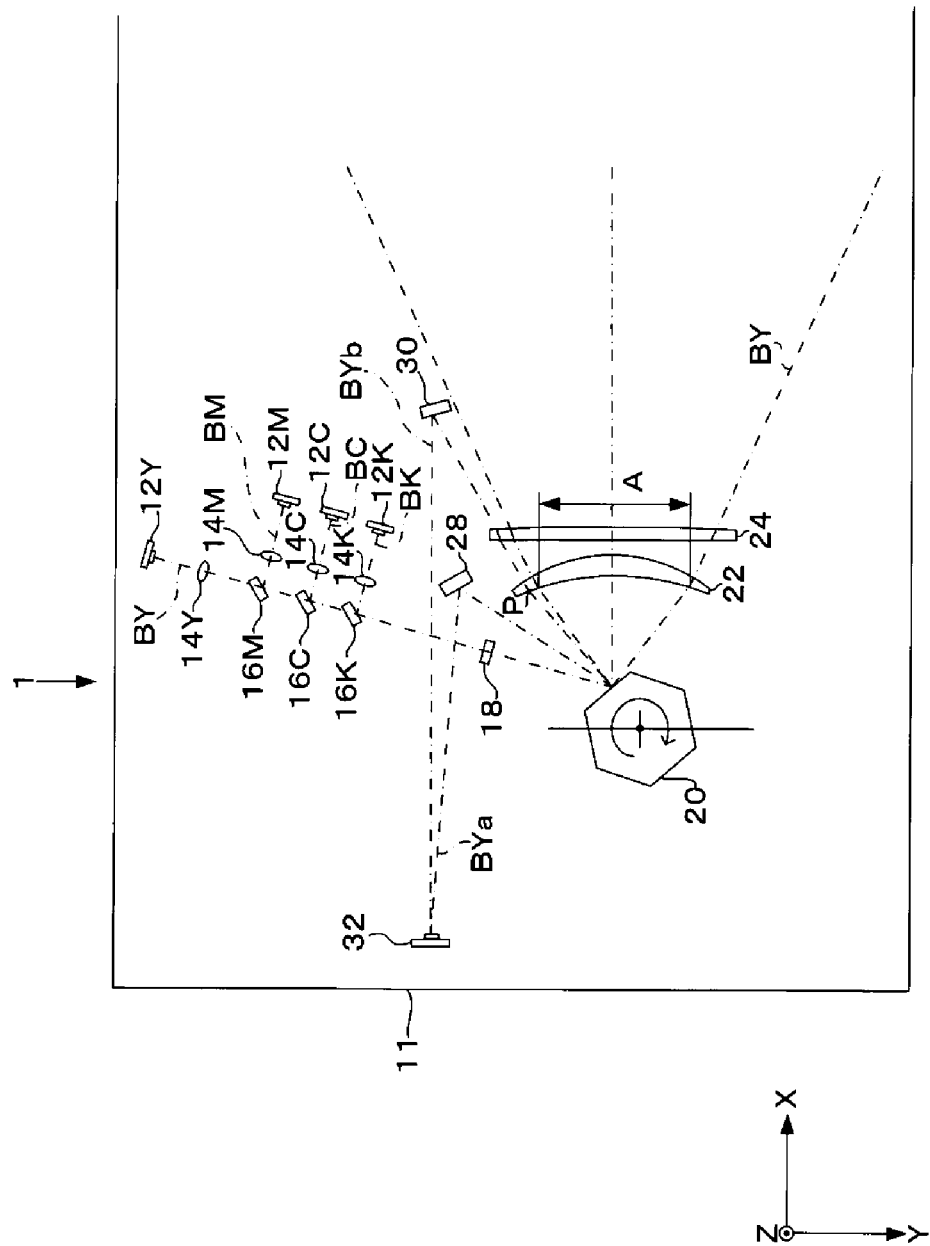
FIG. 1 illustrates the structure of the optical scanning device according to the embodiment.

Optical scanning device 1 according to the embodiment will be described with reference to FIG. 1 and FIG. 2. In FIG. 1 and FIG. 2, the main scanning direction is defined as axial direction Y (Y-axis direction), while the vertical scanning direction is defined as axial direction Z (Z-axis direction). Moreover, the direction perpendicular to axial direction Y and axial direction Z is defined as axial direction X (X-axis direction). In other words, FIG. 1 is the view looking at optical scanning device 1 from axial direction Z; moreover, FIG. 2 is the view looking at optical scanning device 1 from axial direction Y.

Optical scanning device 1 is used for the image formation apparatus (only the optical scanning device and photoconductor are illustrated) provided with photoconductor drums 50 (50Y, 50M, 50C, 50K, refer to FIG. 2). Photoconductor drums 50 are provided according to the number corresponding to a plurality of colours used for the image formation apparatus. That is, photoconductor drum 50Y corresponds to yellow. Photoconductor drum 50M corresponds to magenta. Photoconductor drum 50C corresponds to cyan. Photoconductor drum 50K corresponds to black. Optical scanning device 1 emits beams B (BY, BM, BC, BK) to each of photoconductor drums 50 (50Y, 50M, 50C, 50K) illustrated in FIG. 2, respectively, forming electrostatic line images on the peripheries of photoconductor drums 50.

As illustrated in FIG. 1 and FIG. 2, optical scanning device 1 is configured to include chassis 11, light emitting elements 12 (12Y, 12M, 12C, 12K), collimator lenses 14 (14Y, 14M, 14C, 14K), mirrors 16 (16M, 16C, 16K), cylindrical lens 18, deflector 20, scanning lens 22, scanning lens 24, scanning lenses 26 (26Y, 26M, 26C, 26K), mirror 28, mirror 30, sensor 32, mirrors 34 (34Y, 34M, 34C, 34K), mirrors 36 (36Y, 36M, 36C), mirror 38C, and dust-proof glass 40 (40Y, 40M, 40C, 40K).

Chassis 11 is a member for storing light emitting element 12, collimator lens 14, mirror 16, cylindrical lens 18, deflector 20, scanning lenses 22, 24, 26, mirror 28, mirror 30, sensor 32, mirrors 34, 36, 38C, and dust-proof glass 40 in predetermined positions.

Light emitting element 12 is configured by a laser diode, for example, while emitting beam B. Light emitting elements 12Y, 12M, 12C, 12K respectively form one light source.

Collimator lens 14 shapes beam B emitted by light emitting element 12 into substantially parallel light on surface xy.

As illustrated in FIG. 1, mirror 16M reflects beam BM passing through collimator lens 14M on the deflector 20 side, synthesizing beam BM with beam BY. Thereby, taking a planar view from axial direction Z, beam BY is superimposed on beam BM. As illustrated in FIG. 1, mirror 16C reflects beam BC passing through collimator lens 14C on the deflector 20 side, synthesizing beam BC with beam BY and beam BM. Thereby, taking a planar view from axial direction Z, beam BC, beam BY, and beam BM are superimposed with each other. As illustrated in FIG. 1, mirror 16K reflects beam BK passing through collimator lens 14K on the deflector 20 side, synthesizing beam BK with beam BY, beam BM, and beam BC. Thereby, taking a planar view from axial direction Z, beam BK is synchronized with beam BY, beam BM, and beam BC.

Cylindrical lens 18 focuses beam BY, beam BM, beam BC, and beam BK in axial direction Z.

As illustrated in FIG. 1, deflector 20 is composed of a polygonal mirror with a plurality of reflecting surfaces and a motor (not illustrated) that rotates the polygonal mirror clockwise. Deflector 20 deflects beam BY, beam BM, beam BC, and beam BK emitted onto a reflecting surface in a predetermined direction.

Scanning lens 22, scanning lens 24, and scanning lens 26 are lens through which beam B deflected by deflector 20 pass and provide an image of beam B on photoconductor drum 50. Thereby, as illustrated in FIG. 1, beam B is scanned at a constant speed toward the positive direction side in axial direction Y. Moreover, as illustrated in FIG. 1 and FIG. 2, scanning lenses 22, 24, 26 are provided on the positive direction side in axial direction X and longitudinal direction of scanning lenses 22, 24, 26 agree axial direction Y. Scanning lens 26 of the present embodiment is an example of "an optical element." The detailed structure of scanning lens 26 will be described later.

As illustrated in FIG. 2, mirror 34Y and mirror 36Y reflect beam BY passing through scanning lens 22 and scanning lens 24 to guide beam BY to photoconductor drum 50Y. Scanning lens 26Y is located between mirror 34Y and mirror 36Y. Mirror 34M and mirror 36M reflect beam BM passing through scanning lens 22 and scanning lens 24 to guide beam BM to photoconductor drum 50M. Scanning lens 26M is located between mirror 34M and mirror 36M. Mirror 34C, mirror 36C, and mirror 38C reflect beam BC passing through scanning lens 22 and scanning lens 24 to guide beam BC to photoconductor drum 50C. Scanning lens 26C is located between mirror 36C and mirror 38C. Mirror 34K reflects beam BK passing through scanning lens 22 and scanning lens 24 to guide beam BK to photoconductor drum 50K. Scanning lens 26K is located in front of mirror 34K.

Dust-proof glass 40 is provided on the bottom surface of chassis 11 (the negative direction side surface in axial direction Z) to prevent dust, etc. from entering chassis 11. Beam B passes through dust-proof glass 40 to be imaged on the periphery of photoconductor drum 50.

Mirror 28 reflects beam BY (hereinafter, sometimes referred to as "beam BYa") that is deflected by deflector 20 without passing through scanning lens 22 and scanning lens 24 to guide beam BY to sensor 32. As illustrated in FIG. 1, mirror 28 is provided on the negative direction side in axial direction Y of scanning lens 22. In other words, mirror 28 is provided on the upstream side in the scanning direction of beam B regarding scanning lens 22. Sensor 32 generates control signals by detecting beam BYa reflected by mirror 28 that passes through the negative direction side in axial direction Y as opposed to scanning lens 22 and scanning lens 24 without passing through scanning lens 22 and scanning lens 24.

Mirror 30 reflects beam BY (hereinafter, sometimes referred to as "beam BYb") that is deflected by deflector 20 while passing through point P of scanning lens 22 and scanning lens 24, to guide beam BY to sensor 32. Point P is a point located on the negative-direction side in axial direction Y (on the upstream side in the scanning direction of beam BY) as opposed to image formation area A in scanning lens 22. Image formation area A is an area in scanning lens 22 corresponding to the area where electrostatic line images are formed on photoconductor drum 50Y. In other words, image formation area A is the area in scanning lens 22 through which beam BY passes during the formation of electrostatic line images on photoconductor drum 50Y. Sensor 32 generates control signals by detecting beam BYb that passes through point P of scanning lens 22 and scanning lens 24. For example, control signals generated by sensor 32 are used for correcting the operation of light emitting element 12 in order to form images similar to those upon starting the operation of the device even when the inner temperature of the image formation apparatus, etc. is increased.

[Manufacturing Method of the Optical Element]

Subsequently, the manufacturing method of the optical element according to the embodiment will be described with reference to FIGS. 3A to 5. According to the present embodiment, an injection molding method is used.

Figure 3C:
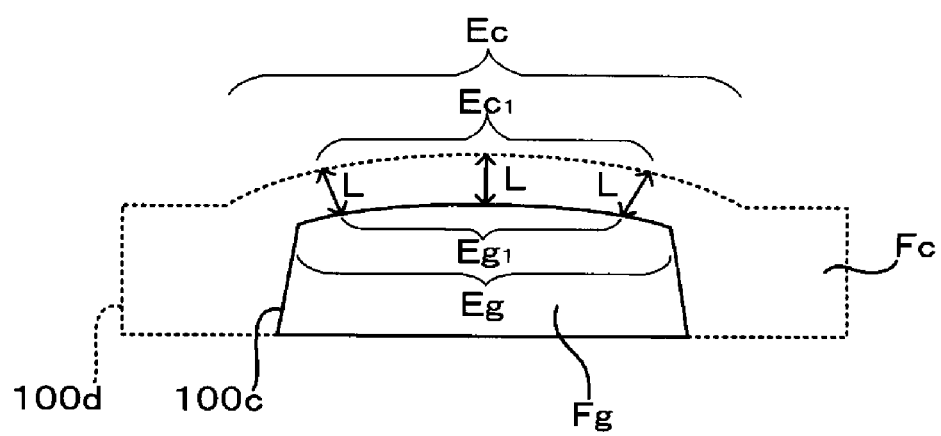
FIG. 3C illustrates the structure of the molding die according to the embodiment.

First, the structure of molding die 100 used for injection molding will be described. FIG. 3A is a cross-sectional view (cross-section A-A in FIG. 3B) of molding die 100 observed from the side. FIG. 3B is a cross-sectional view (cross-section B-B in FIG. 3A) of molding die 100 viewed from the top. FIG. 3C is an enlarged view of cross-section C-C in FIG. 3A. In FIG. 3A and FIG. 3B, in order to facilitate understanding, molding die 100 is partially omitted; however, another structure similar to that illustrated is provided. In other words, molding die 100 is structured to simultaneously create four molded products. As is obvious, the number of simultaneously created molded products is not limited, and the number maybe greater than four or less than four.

Molding die 100 is configured by first die 101 on the fixed side, while second die 102 is configured on the movable side. A resin-filled space is formed between first die 101 and second die 102 by mold-clamping first die 101 and second die 102. This space is configured to include sprue 100a, runner 100b, gate 100c, and cavity 100d. According to the present embodiment, reference mark PL in FIG. 3A indicates a parting surface. Cavity 100d is provided with a molded surface for molding the optical surface and with the periphery of the optical element to be described later. Further, it is possible to define first die 101 as the movable side, in addition to differentiate the position of the parting surface from that of the present embodiment.

Sprue 100a is an inflow passage for allowing a melted liquid resin injected from nozzle a of the injection molding machine to flow into runner 100b. The end of sprue 100a on runner 100b side is formed so as to be larger than the end of the nozzle a side of the injection molding machine of sprue 100a. Sprue 100a is provided on its own in molding die 100.

Runner 100b is an inflow passage for respectively guiding melted resin flowing from sprue 100a into a plurality of cavities 100d. The length and form of runner 100b are determined according to the type of resin, etc.

Gate 100c is an inlet for filling resin from runner 100b into cavity 100d. Gate 100c is provided according to the number corresponding to cavity 100d. The flow rate and direction of resin can be controlled by changing the form of gate 100c. According to the present embodiment, as illustrated in FIG. 3A, gate 100c is formed so as to be narrower than cavity 100d. Moreover, as illustrated in FIG. 3B, gate 100c is formed into a fan-like shape such that the end surface of the cavity 100d side is wider than the end of the runner 100b side. Moreover, gate 100c is configured such that it becomes thicker as it approaches cavity 100d. Due to such a configuration, it becomes possible to completely fill resin into cavity 100d by increasing the temperature of the resin via shear heat generated when the resin passes through gate 100c in addition to reducing the fluid viscosity. Moreover, residual stress, etc. can be reduced, therefore it is possible to reduce imperfect molding such as due to warpage. Further, the resin in gate 100c can be cooled and solidified more quickly than the resin in cavity 100d, therefore it is possible to prevent backflow of the resin from cavity 100d.

Cavity 100d is a gap in which a molding article such as an optical element is molded in molding die 100. In the present embodiment, a plurality of cavities 100d are provided for one molding die 100. Accordingly, using a single molding die 100, a plurality of molding articles can be simultaneously molded.

Here, cross-section C-C in FIG. 3C depicts the connecting piece between gate 100c and cavity 100d. The broken line depicts cavity end surface Fc of the cavity 100d side. The solid line depicts end surface Fg of the gate 100c side. As illustrated in FIG. 3C, cavity 100d has a transcription surface that can transcribe transfer respective parts of the optical element. For example, when forming scanning lens 26 to be described later, cavity 100d has a transcription surface that can mold optical surface M1 (first optical surface) convexly curved on the short direction, flat periphery 26b adjacent thereto, and flat optical surface M2 (second optical surface) on the opposite side of optical surface M1. End surface Fg of the gate 100c side is located within end surface Fc of the cavity 100d side and is formed so as to be narrower than end surface Fc.

Moreover, predetermined range $Ec_1$ of edge Ec of the first die 101 side on end surface Fc of the cavity 100d side is curved, while predetermined range $Eg_1$ of edge Eg of the first die 101 side on end surface Fg of the gate 100c side corresponding to the abovementioned predetermined range is curved according to the example of the edge $Ec_1$; moreover, distance L between both ranges (the distance between both ranges on the boundary surface of the connecting by which connects coupling gate 100c with cavity 100d) is uniformly formed. Here, "the uniform distance" of both includes: (1) the case in which the distance from the location of any one edge to another edge is equal; (2) the case in which the die is designed such that the distance from the location of any one edge to another edge is equal; however, the distance actually varies within an accepted error range; and (3) the range in which the distance from the location of one edge to another edge varies depending on the location but within a permissible range in actual use in the variability. Specifically, "the uniform distance" of both includes any case in which the variation range is suppressed to±3% regarding the variability in the average value of the distance between both. Moreover, the abovementioned predetermined range, for example, is the range falling under the effective region on the optical surface of the optical element that is a molding article. Here, an example of setting a predetermined range on only one side has been described; however, a predetermined range may be set on multiple sides (for example, two opposing sides). In other words, edge of the predetermined range of the second die 102 side on end surface Fc at the cavity 100d side is curved according to the example of the edge of second die 102 corresponding to the abovementioned predetermined range on end surface Fg of the gate 100c side; moreover, distance L between both may be uniformly formed. Moreover, "curved according to the example" includes: (1) the case in which the predetermined range edge is curved in the same form as the intended form; (2) the case in which the predetermined range edge is designed to be curved in the same form as the intended form; however, in fact, there is variability among error range; (3) the case in which the intended form is scaled down to be a similar shape; and (4) the case in which the curvature is at least partly different from that of the intended form; however, the variability is suppressed to a permissible range in actual use.

Figure 4:
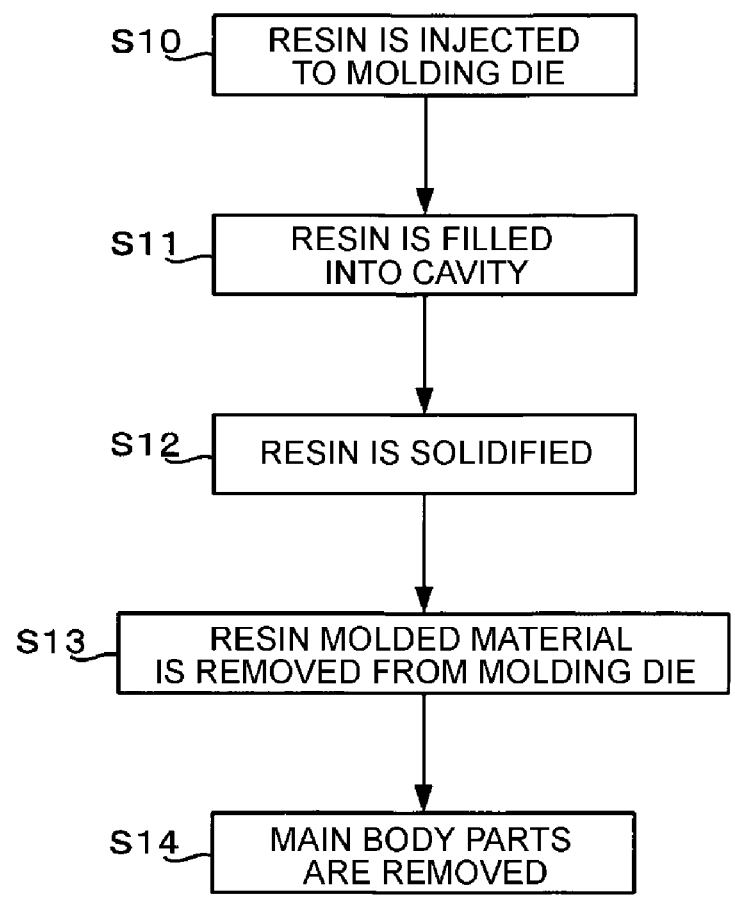
FIG. 4 is a flow chart depicting the manufacturing method of the optical element according to the embodiment.

Hereinafter, a manufacturing method of an optical element using molding die 100 will be described with reference to FIG. 4 and FIG. 5. FIG. 4 is a flow chart showing depicting the manufacturing method of the optical element.

First, a melted resin is injected from nozzle α of the injection molding machine into molding die 100 (S10). The injected resin passes through sprue 100a and runner 100b to reach gate 100c.

The resin in gate 100c is filled into cavity 100d by pressure provided from the injection molding machine via nozzle α (S11). In this case, end surface Fg on the gate 100c side is formed so as to be narrower than end surface Fc on the cavity 100d side. Accordingly, as the resin is filled into wide cavity 100d through narrow gate 100c, backflow of the resin from cavity 100d to gate 100c is prevented.

In addition, distance L between edge Ec within a predetermined range at end surface Fc of the cavity 100d side and the corresponding edge Eg at end surface Fg of the gate 100c side is uniformly formed. Accordingly, even if the injection speed of the resin is increased, the ease (speed) with which resin enters is constant within the present predetermined range and the resin similarly enters into cavity 100d from gate 100c at any site of edge Eg; moreover, the resin smoothly widens from gate 100c to cavity 100d along the shape of the edge. Although the detailed mechanism is not clear, due to the fact that the resin similarly enters into the cavity at any location of edge Eg, it is assumed that little resin involution, etc. is generated, enabling reduction of the generation of flow marks on the optical surface of the molding article.

Resin is solidified by cooling molding die 100 with resin filled into cavity 100d (S12).

Subsequently, the solidified resin molded material is removed from molding die 100 (S13) by separating second die 102 from first die 101 and extruding it via unillustrated injection mechanisms, etc. An example of the detached resin molded material R will be described in FIG. 5. FIG. 5 is a view looking at resin molded material R from the upper side (the same side as FIG. 3B). FIG. 5 partially omits resin molded material R. Resin molded material R is configured to include sprue part 100a' corresponding to sprue 100a, runner part 100b' corresponding to runner 100b, a plurality of gate parts 100c' corresponding to gate 100c, and a plurality of main body parts 100d' corresponding to cavity 100d. Optical surface M is formed in main body part 100d' to allow light to pass therethrough. A predetermined area within the optical surface is defined as effective region ME. According to the present embodiment, as a scanning lens is molded as an optical element, an optical surface is respectively formed on the upper and lower surfaces of main body part 100d', as will be described later. A scanning mirror may be molded as an optical element; moreover, an optical surface may be provided on only one surface in this case.

Regarding resin molded material R, respective main body parts 100d' are removed from gate part 100c' to be individualized (chipped) (S14). These individualized (chipped) main body parts 100d' fall under one optical element.

[Scanning Lens]

Figure 6E:
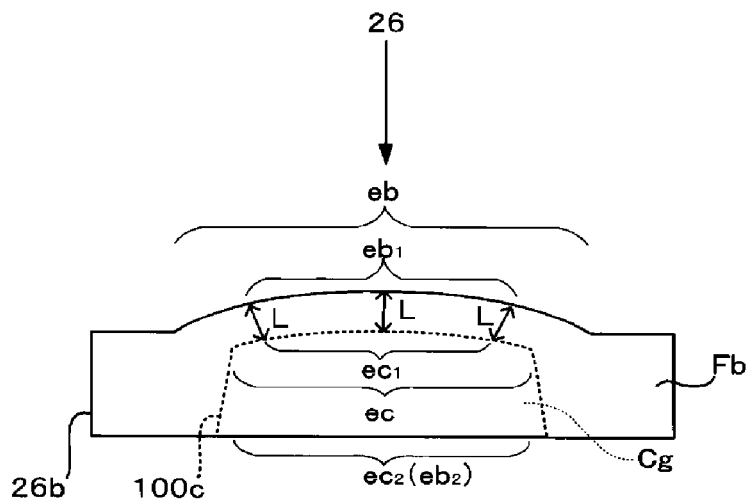
FIG. 6E illustrates the optical element according to the embodiment.
Figure 6F:
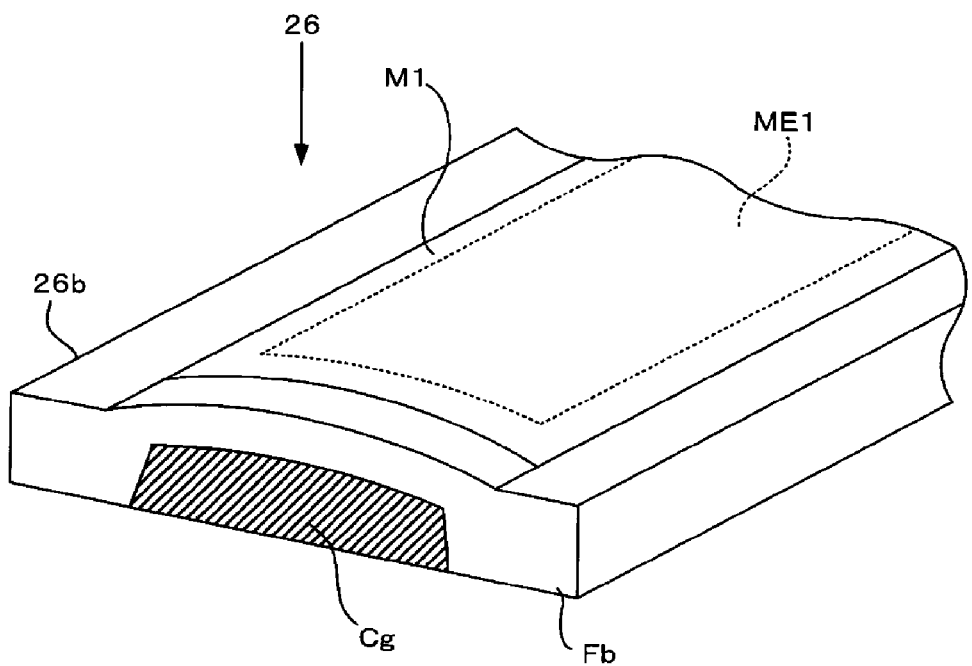
FIG. 6F illustrates the optical element according to the embodiment.

Subsequently, the structure of an optical element manufactured based on the abovementioned manufacturing method will be described in detail, with reference to FIG. 6A and FIG. 6F. Here, the structure of scanning lens 26 will be described as the present optical element. In the following description, the longitudinal direction of scanning lens 26 is defined as direction y, while the short direction is defined as direction z. Moreover, the direction perpendicular to direction y and direction z is defined as direction x. FIG. 6A is a view looking at scanning lens 26 from direction x. FIG. 6B is a view looking at scanning lens 26 from direction z. The broken line in FIG. 6A and FIG. 6B shows gate part 100c' connected to scanning lens 26 upon injection molding. FIG. 6C is an enlarged view (view seen from +y) illustrating the optical part 26a side along cross-section D-D in FIG. 6A. FIG. 6D is an enlarged view (view seen from −y) illustrating the periphery 26b side along cross-section D-D of FIG. 6A. FIG. 6E is an enlarged view (view seen from +y) illustrating the end surface of scanning lens 26 seen from the gate part 100c' side. FIG. 6F is a perspective view of scanning lens 26. FIG. 6F partially omits scanning lens 26.

Scanning lens 26 is a long plate-like member that is injection-molded using the abovementioned molding die 100, etc. Scanning lens 26 is formed of a translucent material made of a thermoplastic resin (for example, polycarbonate). Scanning lens 26 is configured to include optical part 26a including a site serving optical performance and periphery 26b adjacent to the periphery of optical part 26a.

Optical part 26a includes optical surface M to allow light from light emitting element 12, etc. to enter or pass therethrough. According to the present embodiment, in optical surface M, the short direction cross-section is convex curved surface. The curved surface may have a specific curvature or may be a surface (adjustable surface) allowing gradual change of the curvature. Moreover, regarding the present embodiment, the curved surface included in optical surface M has the same form longitudinally continued; however, the forms of optical surface M may be gradually changed longitudinally. Further, effective region ME (the area for reflecting light or allowing light to pass therethrough, that is, the range for maintaining the optical performance upon molding) of a specific size is arranged inside the periphery of optical surface M. Scanning lens 26 is used so as to enter light this effective region ME.

According to the present embodiment, as scanning lens 26 functions as a lens, optical surface M is composed of two optically-opposed optical surfaces provided on two opposing surfaces of optical part 26a. Regarding scanning lens 26 of the present embodiment, one optical surface (first optical surface M1) is formed on the adjustable surface, with the other optical surface (second optical surface M2) composed of a flat surface. Second optical surface M2 may be a curved surface or a curved surface in which the cross-section on the short direction is curved similar to first optical surface M1. On the other hand, in the case of an optical element that functions as a mirror, optical surface M may be formed on any one surface of optical part 26a.

Periphery 26b is provided around optical part 26a. Periphery 26b, for example, functions as a supporting part for supporting scanning lens 26 within optical scanning device 1.

Periphery 26b according to the present embodiment is also provided between optical part 26a and gate part 100c'. For the case in which optical part 26a (optical surface M) and gate part 100c' are continuously configured, the optical performance of optical surface M near gate part 100c' is potentially affected by resin flow, pressure, etc. Therefore, optical performance optical surface M can be easily ensured by providing periphery 26b between gate part 100c' and optical part 26a. That is, periphery 26b also functions to prevent a decrease in the optical performance. In contrast, when very high optical performance is not required for optical surface M near gate part 100c' and space is a priority, moreover, periphery 26b does not necessarily have to be provided between optical part 26a and gate part 100c'.

As illustrated in FIGS. 6B to 6D, the part provided between gate part 100c' and first optical surface M1 in periphery 26b provided on main body part 100d' has a curved surface according to the example of first optical surface M1. More specifically, as illustrated in FIG. 6C and FIG. 6D, at the border between optical part 26a and periphery 26b (cross-section D-D), the cross-sectional form of optical part 26a is identical with the cross-sectional form of periphery 26b. That is, the edge of optical surface M1 and the edge of periphery 26b have the same form at the border between optical surface M1 and periphery 26b and are located in the same position with respect to the light axial direction of scanning lens 26. It is possible to simplify the form of cavity 100d for manufacturing an optical element by having the same cross-sectional forms between optical part 26a and periphery 26b. Moreover, resin smoothly flows from the part corresponding to periphery 26b in cavity 100d into the part corresponding to optical part 26a in cavity 100d as the cross-sectional forms of optical part 26a and periphery 26b are the same, enabling reduction in the generation of flow marks without fail. Further, between the cross-sectional form of optical part 26a and the cross-sectional form of periphery 26b may have margin of error within the range without affecting the optical performance of optical part 26a.

Gate part 100c' is connected to periphery 26b (main body part 100d') on end surface Fb of the gate part 100c' side of periphery 26b.

Here, the virtual boundary surface Cg on the connecting piece between gate part 100c' and scanning lens 26 (main body part 100d') will be described. In FIG. 6E, the broken line depicts boundary surface Cg, while the solid line depicts end surface Fb of the gate part 100c' side of periphery 26b. In FIG. 6F, the shaded area depicts boundary surface Cg. Further, when boundary surface Cg is cut at the connecting piece between gate part 100c' and scanning lens 26 (periphery 26b), the cut surface formed by cutting corresponds to boundary surface Cg. Actually, due to misalignment of the cutting position to the runner side, gate part 100c' is partially left on end surface Fb; however, in this case, boundary surface Cg is the boundary surface at the connecting piece on which gate part 100c' left on the scanning lens 26 side is connected to scanning lens 26 (periphery 26b).

Boundary surface Cg is formed so as to be narrower than end surface Fb of the gate part 100c' side of periphery 26b. Moreover, distance L between part $eb_1$ corresponding to effective region ME1 of optical surface M1 on edge eb on the optical surface M1 side of end surface Fb and part $ec_1$ corresponding to effective region ME1 on edge ec on the optical surface M1 side on boundary surface Cg is uniformly formed. Further, in scanning lens 26, edge $eb_2$ of end surface Fb corresponding to effective region ME2 on optical surface M2 coincides with edge $ec_2$ on the optical surface M2 side on boundary surface Cg. That is, distance L between edge $eb_2$ and edge $ec_2$ is uniform, namely, 0. Distance L between edge $eb_1$ ($eb_2$) and edge $ec_1$ ($ec_2$) does not have to be completely uniform. That is, regarding distance L, some errors may be acceptable as long as the optical performance of scanning lens 26 can be maintained.

On the other hand, on boundary surface Cg, the distance between edges other than edges $ec_1$ and $ec_2$ and the edge of end surface Fb does not have to be uniform. That is, distance L between the edges may be equal on the part for which optical performance must be ensured, at the very least. Further, when distance L between the edge of end surface Fb and the edge of boundary surface Cg is completely uniform, end surface Fb and boundary surface Cg are similarly shaped.

[Operation and Effect]

The operation and effect of the present embodiment will be described.

A long optical element according to the present embodiment is obtained by detaching long main body part 100d'connected to runner part 100b' via gate part 100c'including optical part 26a from gate part 100c'and individualizing the detached main body 100d', with optical part 26a including at least optical surface M1 to allow light to pass therethrough or to reflect light. Optical surface M1 has a curved surface that is curved on the short direction at least at the longitudinal end, while first edge (eb) of the optical surface M1 side on end surface Fb of the gate part 100c' side in main body part 100d'is curved according to the example of optical surface Ml. Boundary surface Cg between main body part 100d' and gate part 100c'is formed so as to be narrower than end surface Fb of the gate part 100c' side of main body part 100d'. At least distance L between site ($eb_1$) corresponding to effective region ME1 on optical surface M1 at the first edge and site ($ec_1$) corresponding to the effective region on optical surface M1 at second edge (ec) of the optical surface M1 side on boundary surface Cg first edge (eb) is uniformly formed. That is, the optical element according to the present embodiment can be easily manufactured and have a structure such that molding imperfections including flow marks can be reduced, ensuring good optical performance.

Moreover, main body part 100d' in the optical element according to the present embodiment has periphery 26b with a curved surface between gate part 100c' and optical surface M1 according to the example of optical surface Ml, while the surface of periphery 26b is located at the same position as optical surface M1 with respect to the light axial direction of the optical element. Alternatively, main body part 100d' has periphery 26b with a curved surface between gate part 100c' and optical surface M1 according to the example of optical surface M1, while the surface of periphery 26b is located at a position lower than optical surface M1 with respect to the light axial direction of the optical element. Thus, the optical element having periphery 26b can reduce the potential to affect the optical performance of optical surface M upon injection molding.

Moreover, in the optical element according to the present embodiment, optical part 26a further comprises optical surface M2 located on the other side of optical surface M1, along with optical surface M2 provided optically opposing optical surface M1.

Thus, the optical element according to the present embodiment can be used as a lens (for example, scanning lens 26).

Moreover, the optical element according to the present embodiment can also be incorporated in the optical scanning device.

Such an optical scanning device has good optical performance, enabling an increase in the size of the device.

Moreover, according to the manufacturing method of an optical element of the present embodiment, a long optical element is manufactured by molding the optical element by allowing resin from the injection molding machine to pass through sprue 100a, runner 100b, and gate 100c in molding die 100, and filling the resin into cavity 100d. The manufacturing method of the optical element comprises the steps of filling resin into a molding die, the molding die configured such that first edge ($Ec_1$) in a predetermined range on end surface Fc of the cavity 100d side is curved at the connecting piece between gate 100c and cavity 100d, the corresponding second edge ($Eg_1$) of end surface Fg of the gate 100c side is curved according to the example of the first edge, end surface Fg of the gate 100c side is formed so as to be narrower than end surface Fc of the cavity 100d side, and distance L between the first edge in the predetermined range and the corresponding second edge of end surface Fg of the gate 100c side is uniformly formed. Moreover, the manufacturing method of the optical element comprises a step of deriving the resin cooled in cavity 100d to separate the resin portion (gate part 100c') corresponding to gate 100c and the resin portion (main body part 100d') corresponding to cavity 100d from each other.

Thus, as the distance between the first edge in the predetermined range on end surface Fc of the cavity 100d side and the corresponding second edge on end surface Fg of the gate 100c side is uniformly formed, the resin smoothly widens from gate 100c to cavity 100d along the shape of the edge. Accordingly, it becomes possible to manufacture an optical element without imperfections in appearance such as flow marks. As a result, defective products are reduced, enabling improvement in the yield ratio. Further, as end surface Fg of the gate 100c side is formed so as to be narrower than end surface Fc of the cavity 100d side, the connecting piece between the resin portion corresponding to cavity 100d (main body part 100d') and the resin portion corresponding to gate 100c (gate part 100c') can be easily assessed. Accordingly, the operation for cutting main body part 100d' from gate part 100c' can be made more efficient.

Moreover, molding die 100 according to the present embodiment comprises sprue 100a, runner 100b, gate 100c, and cavity 100d is used for molding a long optical element. In molding die 100, first edge ($Ec_1$) within a predetermined range on end surface Fc of the cavity 100d side is curved at the connecting piece between gate 100c and cavity 100d, the corresponding second edge ($Eg_1$) of end surface Fg of the gate 100c side is curved according to the example of the first edge, end surface Fg of the gate 100c side is formed so as to be narrower than end surface Fc of the cavity 100d side, and distance L between the first edge in the predetermined range and the corresponding second edge of end surface Fg of the gate 100c side is uniformly formed.

Thus, as distance L between the first edge within the predetermined range of end surface Fc of the cavity 100d side and the corresponding second edge of end surface Fg of the gate 100c side is uniformly formed, the resin smoothly widens from gate 100c to cavity 100d within the predetermined range. Accordingly, imperfections in appearance such as flow marks generated in the molding article can be reduced by using this molding die 100. Moreover, as a result, defective products are reduced, enabling improvement in the yield ratio. Further, as end surface Fg of the gate 100c side is formed so as to be narrower than end surface Fc of the cavity 100d side, the connecting piece between the resin portion corresponding to cavity 100d (main body part 100d') and the resin portion corresponding to gate 100c (gate part 100c') can be easily assessed. Accordingly, the operation for cutting main body part 100d' from gate part 100c' can be made more efficient.

MODIFIED EXAMPLE 1

Scanning lens 26 (optical element) may be configured as illustrated in FIG. 7. FIG. 7 is a perspective view of scanning lens 26 according to Modified Example 1. In FIG. 7, scanning lens 26 is partially omitted. Moreover, in FIG. 7, the shaded area depicts boundary surface Cg.

Periphery 26b according to the present modified example is formed at a position lower than optical surface M1 with respect to the light axial direction of the optical element; however, the present modified example is provided with other similar configurations as those illustrated in FIGS. 6A to 6F. As there is a difference in level between periphery 26b and optical surface M1, it is possible to further reduce the potential of modifying optical surface M1 upon molding along with the contraction of periphery 26b between gate part 100c' and optical surface M1. Moreover, the thickness of gate part 100c' can be made thin.

Further, the structure such that the edge of periphery 26b at the border between optical surface M1 and periphery 26b is of the form according to the example of the cross-sectional form of the edge of optical surface M1 (a similar figure) is possible. Moreover, a structure misaligned in the light axial direction of scanning lens 26 is also possible.

MODIFIED EXAMPLE 2

Moreover, according to the abovementioned embodiments, an optical element with optical surface M and the edge of the corresponding periphery 26b provided on the curved surface has been described. As in the abovementioned embodiments, the edge form of the optical surface of the gate part is preferably curved according to the example of the optical surface and the edge of the corresponding periphery; however, the optical surface (the edge of the corresponding periphery 26b) may take on a complex form in order to achieve desired optical performance. In this case, it is sometimes difficult to form the edge of boundary surface Cg into the form according to the example of the edge of periphery 26b of the optical surface M side. In this case, it is also possible to form the edge of boundary surface Cg into a linearly approximated form. FIG. 8 illustrates end surface Fb of the optical element and boundary surface Cg of gate part 100c' according to the present modified example (view looking at the optical element from the same direction as FIG. 6E). As illustrated in FIG. 8, it is also possible to substantially uniformly form distance L between edge ec of boundary surface Cg and line S approximating edge eb.

Here, substantially uniform distance L means the maximum deviation amount within the gate width of eb for line S is no greater than 5% of the average gate thickness, with the average thickness of the gate in the gate width direction of the gap between the upper-end edge and the lower-end edge of the gate defined as d.

It is difficult to linearly approximate the edge for the case in which the form of the optical surface is complex, the cross-section on the short direction is too uneven, and a difference exists in the resin flow on the short direction of the gate upon molding when the upper edge of the gate is linearly approximated. In this case, the form of the boundary surface is determined according to the example of the form of the optical surface.

EXAMPLE(S)

Figure 9:
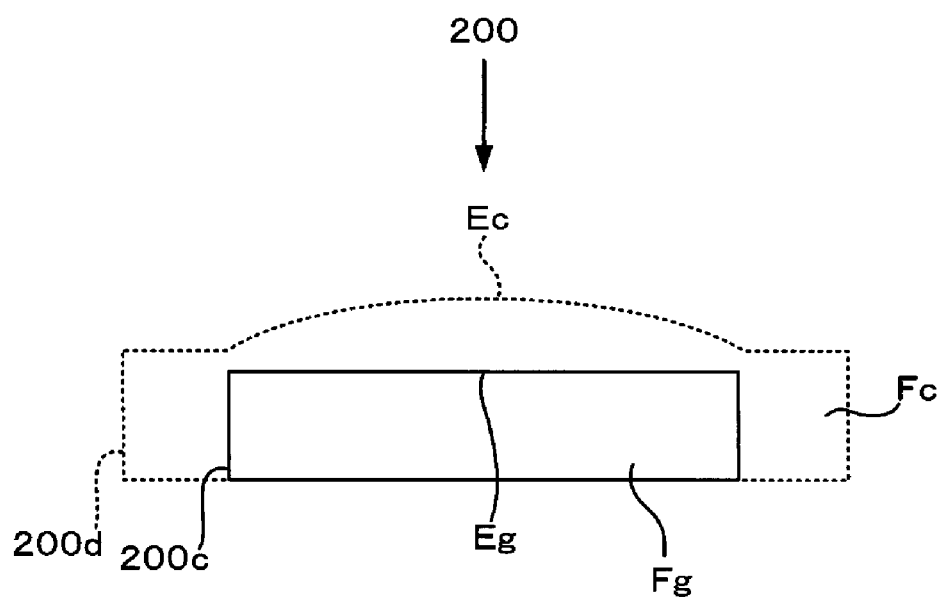
FIG. 9 illustrates the structure of the molding die according to the comparative examples.

Scanning lens 26 structured as described with reference to FIGS. 6A to 6F has been created as a specific example of the present invention, measuring the presence or absence of the generation of flow marks. Moreover, for comparison, as illustrated in FIG. 9, the presence or absence of the generation of flow marks has been measured for the case in which scanning lens 26' is manufactured using molding die 200 with a non-uniform distance between edge Eg of end surface Fg of gate 200c and edge Ec of end surface Fc of cavity 200d at the connecting piece between gate 200c and cavity 200d. Further, FIG. 9 illustrates the cross-section of molding die 200 located at the same position as FIG. 3C.

Figure 10B:
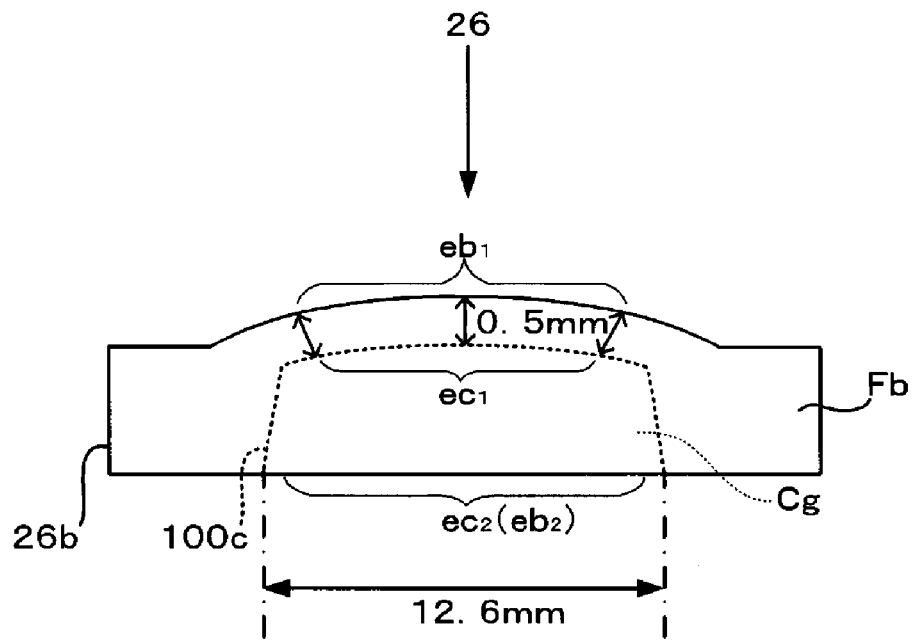
FIG. 10B illustrates the optical element according to the embodiment.

Regarding scanning lens 26, the outer shape is 236 mm×19 mm, the area of optical surface M1 is 228 mm×6.5 mm, and optical surface M1 is curved surface with a maximum height from the surface periphery of 0.5 mm; moreover, optical surface M2 (illustration omitted) is a flat surface (refer to FIG. 10A). Moreover, the width of gate part 100c' is 12.6 mm, while the distance between part $eb_1$ corresponding to effective region ME1 on optical surface M1 and edge $ec_1$ of the optical surface M1 side on boundary surface Cg is uniform at 0.5 mm. Further, the distance between edge $eb_2$ of end surface Fb corresponding to effective region ME2 on optical surface M2 and edge $ec_2$ of boundary surface Cg is 0 (refer to FIG. 10B).

Figure 11:
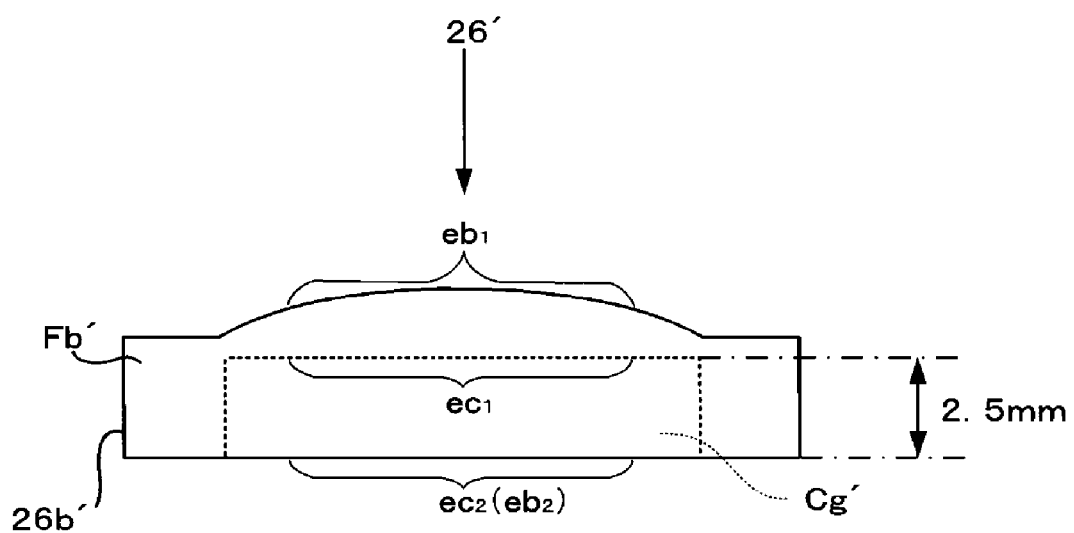
FIG. 11 illustrates the optical element according to the comparative examples.

On the other hand, regarding scanning lens 26', the outer shape, the area of the optical surface, the structure of the optical surface, and the width of the gate part are identical to those of scanning lens 26. On the other hand, scanning lens 26' is different from scanning lens 26 in that the distance between edge $eb_1$ of end surface Fb' corresponding to effective region ME1 of optical surface M1 and edge $ec_1$ of the optical surface M1 side on boundary surface Cg' is not uniform (the thickness of the optical axial of the gate part is uniform at 2.5 mm) (refer to FIG. 11).

The material of scanning lens 26 and scanning lens 26' is polycarbonate (H4000 made by Mitsubishi Engineering-Plastics Corporation). Moreover, the molding condition (die temperature: 125° C.; maintained pressure: 90 MPa) and the molding machine to be used (FUNAC ROBOSHOT S2000. Screw diameter: φ40. "FUNAC" and "ROBOSHOT" are registered trademarks) are regarded as identified.

Under these conditions, multiple injection moldings are carried out while changing the injection speed, a plurality of molding articles (a plurality of scanning lenses 26; a plurality of scanning lenses 26') are manufactured, and the molding articles are visually confirmed for the presence or absence thereof and flow marks are confirmed the presence or absence. The injection speed is changed by changing the moving speed of the screw of the injection molding machine in three stages, 10 mm/s, 20 mm/s, and 30 mm/s.

As a result, regarding scanning lens 26, the generation of flow marks has not been confirmed despite the injection speed. On the other hand, regarding scanning lens 26', it has been observed that flow marks are generated at the position 10 to 20 mm from the end surface of gate part side of the optical surface in the longitudinal direction of the element at any injection speed.

What is claimed is:

1. An injection molded optical element comprising:
an optical part extending in a longitudinal direction, the optical part comprising:
a first optical surface curved such that a height of the first optical surface in a height direction perpendicular to the longitudinal direction varies along a short direction, the short direction being perpendicular to the height direction and the longitudinal direction; and
an optical part end face provided at a first end of the optical part in the longitudinal direction;
wherein an intersection of the first optical surface and the optical part end face defines a first optical surface edge; and
a gate part comprising a gate part end face which has a curved gate part edge when the gate part is viewed from the longitudinal direction;
wherein the gate part end face is adjacent to the optical part end face;
wherein the curved gate part edge is substantially parallel to the first optical surface edge; and
wherein a width of the gate part in the short direction is narrower than a width of the optical part in the short direction.

2. The injection molded optical element according to claim 1, wherein the optical part further comprises a periphery region at the first end of the optical part.

3. The injection molded optical element according to claim 2, wherein a height of the periphery region in the height direction at a given point along the short direction is shorter than a height of the first optical surface in the height direction at a corresponding point along the short direction.

4. The injection molded optical element according to claim 1, wherein the optical part further comprises a second optical surface provided on a side of the optical part opposite to the first optical surface.

5. A molding die assembly for use in manufacturing an injection molded optical element, the molding die assembly comprising:
a die defining an internal space comprising:
a gate comprising a cavity-side gate opening and a curved gate edge; and
a cavity extending in a longitudinal direction, the cavity corresponding to the injection molded optical element;
wherein the cavity comprises:
a first cavity surface curved such that a height of the first cavity surface in a height direction perpendicular to the longitudinal direction varies along a short direction, the short direction being perpendicular to the height direction and the longitudinal direction; and
a cavity end face provided at a first end of the cavity in the longitudinal direction;
wherein an intersection of the first cavity surface and the cavity end face defines a first cavity edge;
wherein the cavity-side gate opening opens into the cavity;
wherein the gate comprises the curved gate edge when the gate is viewed from the longitudinal direction;
wherein the curved gate edge is substantially parallel to the first cavity edge; and
wherein a width of the cavity-side gate opening in the short direction is narrower than a width of the cavity in the short direction.

6. A method of manufacturing an injection molded optical element, the method comprising:
providing a die defining an internal space comprising:
a gate comprising a cavity-side gate opening and a curved gate edge; and
a cavity extending in a longitudinal direction, the cavity corresponding to the injection molded optical element;
wherein the cavity comprises:
a first cavity surface curved such that a height of the first cavity surface in a height direction perpendicular to the longitudinal direction varies along a short direction, the short direction being perpendicular to the height direction and the longitudinal direction; and
a cavity end face provided at a first end of the cavity in the longitudinal direction;
wherein an intersection of the first cavity surface and the cavity end face defines a first cavity edge;
wherein the cavity-side gate opening opens into the cavity;
wherein the gate comprises the curved gate edge when the gate is viewed from the longitudinal direction;
wherein the curved gate edge is substantially parallel to the first cavity edge; and
wherein a width of the cavity-side gate opening in the short direction is narrower than a width of the cavity in the short direction;
filling resin into internal space defined by the die;
cooling the resin to form the injection molded optical element, the injection molded optical element comprising a gate part corresponding to the gate and an optical part corresponding to the cavity;
separating the gate part from the optical part.

* * * * *